United States Patent Office 2,729,614
Patented Jan. 3, 1956

2,729,614

STABILIZATION OF OXYGEN-SENSITIVE MATERIALS WITH SUBSTITUTED GUANYLGUANIDINES

David O. De Pree, Royal Oak, and Eugene F. Hill, Birmingham, Mich., assignors to Ethyl Corporation, New York, N. Y., a corporation of Delaware No Drawing. Application April 1, 1953,
Serial No. 346,282

8 Claims. (Cl. 260—45.9)

This invention relates to antioxidants suitable for addition to materials that are normally subject to deterioration in contact with oxygen. In particular, this invention relates to the stabilization of elastomeric material against the adverse effects of oxygen and ozone.

Because of the excellent elastic properties of natural rubber, it has found application in enormous quantities for a great variety of purposes. It occurs in the latex of various tropical trees of the Euphorbiacea, Apocynacese and Moraceae families. In practice, however, rubber is produced almost exclusively from trees of the species Hevea brasiliensis, which are indigenous to Brazil.

As eminent authors have indicated, it is unfortunate that elastomeric substances produced synthetically have been given the name synthetic rubber for, strictly speaking, synthetic rubber would be a material identical with natural raw rubber, but prepared synthetically. However, common usage has brought about a secondary meaning in the term synthetic rubber, that of a rubber-like material or rubber substitute.

Chemists had long been intrigued with the idea of producing synthetic rubber. However, this interest was intensified by the exigencies of military necessity, due principally to the difficulty of procuring natural rubber from its geographical sources. Perhaps the first noteworthy synthetic rubbers produced were the methyl rubbers predicated upon 2,3-dimethylbutadiene as a raw material. As a result of this work several techniques were developed to bring about polymerization of dimethylbutadiene to produce methyl rubbers of varying physical properties thereby enabling their use for diverse purposes. However, notwithstanding concerted efforts, methyl rubbers never attained commercial significance since these rubbers are easily oxidized. The numerous antioxidants developed in an attempt to correct this defect proved ineffective.

A more successful synthetic rubber from a commercial standpoint is chloroprene or polychloroprene. This material is generally prepared by the addition of hydrogen chloride to vinyl acetylene followed by polymerization.

Another type of synthetic rubber generally called Buna has undergone a significant amount of development and commercialization. Buna rubber is prepared by the polymerization of butadiene, a process originally involving the use of sodium. The subsequent development of emulsion polymerization led to the development of co- or inter-polymerization and as a result two Buna rubbers, Buna-S and Buna-N have attained particular commercial significance. The first of these is a co-polymer produced by introducing about 25 per cent of styrene into the butadiene chain whereas the latter is a combination or mixed polymer of butadiene with a substantial portion of acrylonitrile. Other co-polymers of butadiene have been developed, some of which are of considerable economical importance. An example is GRS which is prepared by methods similar to Buna-S but which possesses different physical properties.

A fourth synthetic rubber known as polysulfide rubber results from the interaction of organic dichlorides with alkali sulfides. By altering the starting materials and the reaction conditions many polysulfide rubbers of differing physical properties have been prepared.

By about 1940 another type of synthetic rubber, polybutene rubber, was developed. Such is derived essentially from isobutene which is polymerized rapidly by the use of aluminum chloride or boron fluoride as catalyst.

The vinyl resins comprise another type of synthetic rubbers in spite of the fact that they are resins and show rubber-like characteristics only when plasticized by the addition of another ingredient. In general, the most extensively used elastomeric vinyl resins comprise the polymers and copolymers of vinyl chloride.

Another type of synthetic elastomeric materials is the perfluoralkyl acrylate homopolymers. Although it has been found that the incorporation of butadiene as comonomer improves low temperature flexibility of these materials, the resistance to heat, ozone and organic solvents is apparently reduced.

The preceding discussion does not purport to be complete inasmuch as there are literally hundreds of synthetic rubbers. Indeed, with the widespread developments in this field various attempts have been made to classify elastomers in an orderly manner. Thus, it has been proposed to sub-divide elastomers into four general types, to wit: elastoprenes, elastolenes, elastothiomers, and elastoplastics. According to this classification system the elastoprenes comprise butadiene rubbers, piperylene rubbers, isoprene rubbers, dimethylbutadiene rubbers, and haloprene rubbers. The term elastolenes encompasses polymers formed in the presence of a catalyst such as boron trifluoride. Polyisobutylene serves as an example. The term elastothiomers includes materials such as the polyalkylene sulfides. Polymers of acrylic and methacrylic esters, mixed glyptals, plasticized polyvinyl chloride, polyvinyl acetate, polystyrene, polyarylenethylenes or polyxylenes and polyphosphonitrilic chloride are among the substances known as elastoplastics.

For convenience in describing many of the aspects of the present invention hereinafter, the term elastomeric materials is used. It is to be understood that this term encompasses the natural and synthetic rubber-like materials typical examples of which have been described hereinbefore.

Although some of the aforementioned materials are more susceptible than others to deterioration in the presence of oxygen or ozone, generally speaking the need exists for materials capable of protecting elastomeric materials against such deterioration. It is axiomatic that elastomeric materials susceptible to absorption of oxygen with consequent destruction of certain useful physical properties renders articles manufactured from such materials of limited utility. By absorption of oxygen such elastomers deteriorate prematurely, lose tensile strength and flexibility, and become discolored and embrittled. While certain materials have been proposed for the protection of such elastomers from the deleterious action of oxygen most of such protective substances as, for example, β-naphthol, possess the serious disadvantage, particularly with respect to light colored stocks that their own degradation products are themselves colored and hence interfere with the color fastness of the stocks being protected.

It is, therefore, an object of the present invention to provide means for protecting oxygen-sensitive materials which deteriorate in or are affected adversely by oxygen or ozone. It is a further object of this invention to provide means for protecting elastomeric materials against deleterious effects of oxygen and ozone. A particular object of the present invention is to provide elastomeric materials protected against deterioration in the presence of oxygen or ozone. Likewise, it is an object of our invention to provide means for preventing embrittlement, discoloration, loss of tensile strength and other harmful effects in elastomers during the milling, compounding, fabrication, storage, handling and use of such elastomer stocks. Still further objects of our invention will appear from the description of our invention as hereinafter disclosed.

It has been discovered that the incorporation in elastomeric materials of compounds produced by reacting dicyandiamide with compounds possessing at least one aromatic ring which is substituted with one amino group and at least one activating group as defined hereinafter results in a composition stable to the deleterious effects of oxygen or ozone. The reaction, in general, appears to be a simple condensation such that substituted guanylguanidines are formed. The reaction materials are relatively inexpensive and the reaction is quite simple and produces very good yields.

It has been found that effective antioxidant materials result from the reaction between dicyandiamide and compounds possessing the general formula

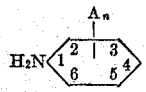

wherein A, which represents the activating function, is selected from the group of radicals consisting of amino, monoaliphatic amino, monoalicyclic amino, dialiphatic amino, dialicyclic amino, hydroxy and alkoxy, and $n$ is a small whole integer from 1 to 5 inclusive. The nature of the aliphatic amino and alicyclic amino activating groups will be considered in greater detail heerinafter. Generally speaking, the nitrogen-containing activating functions as described above are equivalent to those containing oxygen. However, it will be understood from subsequent considerations that under certain circumstances the nature of this activating function is of considerable importance from the standpoints of antioxidant effectiveness, solubility, miscibility and compatibility. Thus, the presence of at least one amino-type activating function is sometimes a critical feature of this invention. In other instances beneficial effects can be obtained with any of the aforementioned activating groups.

Referring to the above general formula representing the class of materials which can be condensed with dicyandiamide to prepare antioxidants useful in accordance with the present invention, it is to be noted that when $n$ is less than 5, that is, when the aromatic portion of the substituted anilines possesses at least one carbon atom which is not substituted with an activating group, the unsubstituted carbon atom or atoms on the ring can be substituted with one or more lower alkyl radicals which contain from one to about eight carbon atoms. Similarly, it is to be indicated that the benzene ring as shown in the preceding general formula can be fused with other cyclic radicals as, for example, in the case of amino naphthalenes, amino anthracenes, amino tetrahydronaphthalenes, and the like.

The mono and dialiphatic substituted amino activating groups are radicals wherein one or both of the hydrogen atoms of a conventional amino group are substituted with an aliphatic hydrocarbon radical. Such aliphatic radicals are selected from the class consisting of alkyl, aralkyl, aryl, and alkaryl radicals. In general, however, it is preferred to employ mono- and dialkyl-amino groups as activating functions in the reactants for the preparation of the antioxidant materials of the instant invention. That is to say, the mono- and dialiphatic amino substituents in the aromatic nucleus are preferably such radicals as N-methyl amino, N-ethyl amino, N-propyl amino, N-isopropyl amino, N-butyl amino, N-isobutyl amino, N-sec-butyl amino, N-t-butyl amino, and likewise, the monoalkyl amino radicals substituted with the diverse pentyl, hexyl, heptyl and octyl radicals, N,N-dimethyl- amino, N,N-diethylamino, N,N-dipropylamino, N,N-diisopropylamino, N-methyl-N-ethylamino, N-ethyl-N-sec-butylamino, and similar radicals up to and including about dioctylamino radicals. The alicyclic amino radicals comprising the activating groups in certain embodiments of the starting materials for the preparation of the antioxidant materials utilized in accordance with the present invention can be considered as cycloaliphatic amino radicals. In other words, in those embodiments of the present invention wherein the activating amino type radical is substituted with one or two cycloaliphatic groups, the resulting radicals include, for example, such radicals as cyclohexyl amino, dicyclohexyl amino, mono-(β-cyclohexylethyl)-amino, di-(γ-cyclohexylpropyl)-amino, and the like.

As an example of the general methods for preparing the antioxidant materials utilized in accordance with the present invention, dicyandiamide can be mixed with p-aminophenolhydrochloride in approximately equal molecular proportions and heated with stirring until the mixture melts. The molten product is then cooled and is a crude form of the hydrochloride of N-(4-hydroxyphenyl)-N'-guanylguanidine having the following structural formula

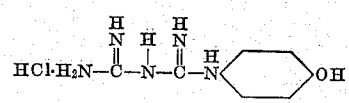

The free base is readily formed by reacting the chloride with a neutralizing agent such as sodium carbonate in water solution. The hydrochloride as well as the free base is readily soluble in water and can be recrystallized from water solution. In fact, when the free base is liberated it can be recovered by a crystallizing operation effected by merely cooling the neutralized solution and filtering off the crystals that form.

The crystallized material has a melting point of 203 to 204° C. For use in oxygen-sensitive materials, the condensation product can be used in recrystallized condition or in the essentially impurified form obtained by simply evaporating off the neutralized solvent and extracting the organic material with methanol or other suitable solvent.

By reacting any of the starting materials discussed hereinbefore with dicyandiamide the antioxidant materials utilized in accordance with the present invention are readily obtained in high yield and purity. For example, by reacting dicyandiamide with such materials as p-phenylenediamine, 2-methyl-p-phenylenediamine, α-aminonaphthalene, β-amino-1,2,3,4-tetrahydronaphthalene, the corresponding guanylguanidines are obtained.

As will become still further apparent from the discussion hereinafter, antioxidant protection can be afforded to oxygen-sensitive materials by employing small but effective proportions of the condensation products obtained by reacting dicyandiamide with suitably substituted aminophenols or arylene polyamines. Suitable reactants of this nature include such substances as m-aminophenols, o-aminophenols, 1,3-dihydroxy-5-aminobenzene, 1,3-dihydroxy-4-aminobenzene, aminohydroquinone, aminophlorglucinol, 1-hydroxy-4-amino naphthalene, o-phenylenediamine, m-phenylenediamine, 2,3,5,6-tetramethyl-p-phenylenediamine, symmetrical triaminobenzene, 1,4-diaminonaphthalene, 1-amino-3,5-dihydroxy mesitylene, 3-ethoxyaniline, 3,5-dimethoxy aniline, 4-butoxy-3,5-dimethyl aniline, 1,2,3,4-tetrahydro-5,8-diamino naphthalene, 4,5-dihydroxy-α-amino naphthalene, and the like. It will be apparent that the nature of the compound to be condensed with dicyandiamide, that is, the compound possessing at least one aromatic ring which is substituted with one amino group and at least one activating group selected from the class consisting of amino, monoaliphatic amino, monoalicyclic amino, dialiphatic amino, dialicyclic amino, hydroxy and alkoxy, is contingent upon a number of factors. For example, the nature of the starting materials employed in the preparation of the guanylguanidines used in accordance with this invention depends upon the nature of the elastomeric material in which the guanylguanidine is to be employed. Likewise, both the amount of protection desired and the conditions under which the end product are to be utilized are considered in the choice of the reactants.

In the protection of inherently unstable materials against the deleterious effects of oxygen or ozone, consideration is given to the nature of the activating function or functions represented in the preceding general formula as A. By way of example, in the stabilization of elastoplastics beneficial results are obtained by using the condensation product obtained from dicyandiamide and such materials as p-aminophenol, p-phenylenediamine, N-methyl - p - phenylenediamine, N,N - diethyl - p - phenylenediamine, and the like. In the stabilization of elastoprenes against the adverse effects of oxygen or ozone, we particularly prefer to employ the condensation products obtained by reacting dicyandiamide with phenylenediamines, such as the m-, o-, and p-phenylenediamines per se and, likewise, such p-phenylenediamines wherein one of the amino groups is substituted with lower alkyl radicals as defined hereinbefore. As indicated previously, the uncoupled amino group or substituted amino group serves as an activating function, that is, it enhances the antioxidant effectiveness of the condensation product. Similarly, such activating groups likewise impart the proper balance of solubility thereby facilitating the milling, fabricating and compounding operations attendant with the preparation of the useful products derived from elastomeric materials. In some cases, we find it efficacious to employ alkyl substituted phenylenediamines for this purpose, the presence of one or more alkyl groups in the aromatic portion of the radical serving as a compatibility or solubilizing hydrocarbon "tail." The presence of the alkyl substituents on the amino activating groups and also in the nucleus of the aromatic portion of the starting materials used in the preparation of the antioxidant materials is also important in the stabilization of the elastomeric materials possessing relatively low organic characteristics, as for example, "inorganic synthetic rubbers." In those embodiments of this invention wherein we employ the condensation products obtained by reacting dicyandiamide with alkoxy substituted anilines, that is, wherein the activating function consists of one or more alkoxy groups, the preceding benefits with regard to solubility and miscibility are likewise obtained.

The addition to the materials to be protected against oxygen is preferably made in relatively small concentrations. Thus, for example, in the stabilization of elastomeric substances of the character described hereinbefore, we can employ amounts of the condensation products such that the resulting stabilized elastomer contains between about 0.01 per cent by weight up to about 0.1 per cent by weight. In some cases we find that somewhat higher concentrations can be tolerated and, indeed, are frequently preferred. The concentration of the condensation products utilized as antioxidants in accordance with the present invention is determined largely by the nature of the antioxidant utilized, the nature of the elastomeric material to be stabilized, and the amount of protection desired.

To illustrate the utility of the guanylguanidines as antioxidants for elastomeric materials we select a natural rubber compounded into a typical tire-tread formula. One requisite of such stocks is that the desirable properties incorporated therein by careful selection of the compounding ingredients and cure time shall be maintained during extended periods of storage or use in the presence of oxygen. Comparison of various rubber stocks is best carried out on stocks initially having the same of cure. The most reliable means for determining the state of cure is by the T–50 test, ASTM designation: D599–40T described in the ASTM Standards for 1946, Part III–B. This test measures the temperature at which a test piece recovers its elasticity when it is stretched at room temperature, frozen at a sufficiently low temperature to cause it to lose its elastic properties, and then gradually warmed. In practice the temperature noted is that at which the sample recovers to 50 per cent of the original elongation and is, therefore, referred to as the T–50 value. In the examples that follow stocks for testing and comparison are cured for a time sufficient to have a T–50 value of $+1°$ C., so that a valid comparison of the properties can be made. The accelerated aging is conducted by the procedure of ASTM designation: D572–42, described in the ASTM Standards for 1946, Part III–B, for a period of 96 hours at a temperature of $70°$ C., with an initial oxygen pressure in the test bomb of 300 pounds per square inch gauge on specimens having the following compositions:

| | Parts by weight |
|---|---|
| Smoked sheet | 100.00 |
| Carbon black | 45.00 |
| Zinc oxide | 5.00 |
| Stearic acid | 3.00 |
| Pine tar oil | 2.00 |
| Sulfur | 3.00 |
| Mercapto-benzothiazole | 0.65 |
| Stabilizing ingredient | 1.00 |

To demonstrate the protection afforded to an elastomer by the guanylguanidines as described hereinbefore the tensile strength and the ultimate elongation of stocks prepared with the addition of a guanylguanidine are determined before and after aging. These properties are compared with the same properties determined on an identical rubber stock not protected by an inhibitor. Both of these properties are determined by means of the test procedure of ASTM designation: D412–41, fully described in ASTM Standards for 1946, Part III–B. The tensile strength is the tension load per unit cross sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substances. By utilizing such test procedures we find that we can enhance the useful properties of the aforementioned tire-tread formula by the incorporation therein of minor proportions of N-(4-hydroxyphenyl)-N'-guanylguanidine. However, as previously indicated we find it efficacious to replace the hydrogen atom of the hydroxy group of the previous antioxidant with lower alkoxy groups so as to obtain the necessary balance of solubility and miscibility, thereby facilitating compounding and blending operations. By the same token, we find that particularly beneficial results are obtained by the incorporation in natural rubber of such compounds as N-(4-aminophenyl)-N'-guanylguanidine, N-(3-aminophenyl)-N'-guanylguanidine, N-(5-ethyl-3-aminophenyl)-N'-guanylguanidine, and in particular the aforementioned compounds wherein one or both of the hydrogen atoms on the uncondensed amino group are replaced with lower alkyl radicals such as methyl and ethyl.

The foregoing examples of the improvement in the ultimate qualities of natural rubber by the agency of greater protection against the adverse effects of oxygen are merely illustrative. By employing similar guanylguanidines as for example, the condensation products obtained by reacting dicyandiamide with 3,5-dimethyl-4-ethoxy aniline, 2,4,6-trihydroxy aniline, symmetrical triaminobenzene, and the like in such elastomeric materials as elastoprenes and elastoplastics the severity of the oxygen attack and deterioration is greatly reduced. By way of example, we find that the incorporation of minor proportions of N-(p-ethoxyphenyl)-N'-guanylguanidine in butadiene rubber greatly enhances its effective utilization as determined by the aforementioned test procedures. Other variations in the selection of the guanylguanidines and the elastomers to be stabilized thereby will become apparent to one skilled in the art.

A feature of the present invention is that the guanylguanidine type antioxidant is relatively inexpensive to prepare, and is made from inexpensive raw materials. In fact, the cost of providing the antioxidant protection in accordance with the present invention appears to be substantially lower than is possible with most antioxidants now enjoying commercial use.

As many apparently widely different embodiments of this invention may be made without departing from the spirit and scope hereof, it is to be understood that the invention is not limited to the specific embodiments hereof, except as defined in the appended claims. By way of example, the antioxidants of the present invention are particularly suitable for use in the form of solutions in inert carriers in combination with other known antioxidants. Thus, when utilizing the guanylguanidines of the character described hereinbefore in elastomeric substances it is frequently beneficial to employ therewith minor proportions of such materials as β-naphthol, substituted hydroquinones, substituted ureas, substituted thioureas, and the like. Therefore, that which we seek to protect by Letters Patent appears in the appended claims.

We claim:

1. A new composition stable to oxidation comprising a rubbery high molecular weight organic material normally tending to deteriorate in the presence of oxygen and in quantity sufficient to inhibit such deterioration an antioxidant comprising the product obtained by condensing dicyandiamide with a compound possessing at least one aromatic ring which is substituted with one amino radical and a radical selected from the group consisting of amino, substituted amino, hydroxy and alkoxy groups.

2. The composition of claim 1 wherein said antioxidant comprises a product obtained by condensing dicyandiamide with a compound possessing at least one aromatic ring which is substituted with one amino radical and at least one mono-substituted amino group.

3. The composition of claim 1 wherein said antioxidant comprises a product obtained by condensing dicyandiamide with a compound possessing at least one aromatic ring which is substituted with one amino group and at least one disubstituted amino group.

4. The composition of claim 1 wherein said antioxidant comprises a product obtained by condensing dicyandiamide with a compound possessing at least one aromatic ring which is substituted with one amino group and at least one hydroxy group.

5. The composition of claim 1 wherein said antioxidant comprises a product obtained by condensing dicyandiamide with a compound possessing at least one aromatic ring which is substituted with one amino group and at least one alkoxy group.

6. The composition of claim 1 wherein said antioxidant is a guanylguanidine obtained by condensing dicyandiamide with a phenylenepolyamine.

7. The process of protecting a rubbery high molecular weight organic material normally tending to deteriorate in the presence of oxygen comprising blending therewith a small but effective amount of the composition of claim 1.

8. A new composition stable to oxidation consisting essentially of a rubber formulation and, in quantity sufficient to inhibit oxygen deterioration, N-(4-hydroxyphenyl)-N'-guanylguanidine.

References Cited in the file of this patent

UNITED STATES PATENTS

| | | |
|---|---|---|
| 2,373,021 | Downing et al. | Apr. 3, 1945 |
| 2,433,849 | Lathrop et al. | Jan. 6, 1948 |